United States Patent [19]

Antes et al.

[11] 4,297,001

[45] Oct. 27, 1981

[54] PROJECTION SCREEN AND METHOD FOR MAKING SAME

[75] Inventors: Gregor Antes, Zurich; David L. Greenaway, Oberwil, both of Switzerland

[73] Assignee: LGZ Landis & Gyr Zug AG, Zug, Switzerland

[21] Appl. No.: 95,097

[22] Filed: Nov. 16, 1979

Related U.S. Application Data

[63] Continuation of Ser. No. 852,089, Nov. 16, 1977, abandoned.

[30] Foreign Application Priority Data

Nov. 16, 1976 [CH] Switzerland .................. 14379/76

[51] Int. Cl.$^3$ .............................................. G03B 21/60
[52] U.S. Cl. .................................. 350/129; 264/45.5; 428/159
[58] Field of Search ................ 350/129, 117, 397–398; 428/116–118, 158–160, 305, 310, 311, 315, 593, 613, 910; 8/675; 264/41, 45.5

[56] References Cited

U.S. PATENT DOCUMENTS

| | | |
|---|---|---|
| 2,237,567 | 4/1941 | Land .................................. 350/397 |
| 2,328,219 | 8/1943 | Land .................................. 350/398 |
| 2,454,515 | 11/1948 | Land .................................. 350/398 |
| 3,154,461 | 10/1964 | Johnson ............................ 428/159 |
| 3,214,234 | 10/1965 | Bottomley ............................. 8/675 |
| 3,408,132 | 10/1968 | Chandler et al. ............... 350/129 X |
| 3,607,596 | 9/1971 | Fairbanks ........................ 428/158 X |

Primary Examiner—Richard A. Wintercorn
Attorney, Agent, or Firm—Ernest F. Marmorek

[57] ABSTRACT

A projection screen is disclosed having a surface formed by a plurality of irregularly distributed microstructural elements shaped like the outer surface of contiguous bubbles. Also disclosed is a method for making such projection screens.

22 Claims, 7 Drawing Figures

PROJECTION SCREEN AND METHOD FOR MAKING SAME

This is a continuation of application Ser. No. 852,089, filed on Nov. 16, 1977, now abandoned.

BACKGROUND OF THE INVENTION

1. Field of the Invention

This invention relates to projection screens and to a method for making projection screens.

2. Description of the Prior Art

Known projection screens can be subdivided into two groups:

Group (A) Diffuse scattering projection screens with a matte surface, whereby the brightness of the picture is substantially independent of the viewing angle.

Group (B) Selectively scattering projection screens which concentrate the light scattered on the screen surface within a particular solid angle, and specifically in the case of a first sub-group $B_1$ in a solid angle which encloses the incident direction of the light, and in a second sub-group $B_2$ in a solid angle enclosing the reflection direction of the light on the projection screen plane. Known projection screens with a bead-, lens- or prism-like structure belong to sub-group $B_1$ and screens with a rough metallized surface belong to sub-group $B_2$.

The light output and radiation characteristics of a projection screen can be represented in a polar diagram which shows the light intensity of the light scattered on the screen as a function of the viewing angle under particular lighting conditions. FIG. 1 of the accompanying drawings show such a polar diagram in which P is the projection screen plane, I the incident light direction and $\phi$ the viewing angle. The semi-circular curve A shows the radiation characteristics of a diffuse scattering projection screen of Group A, and the pear-shaped curve B the radiation characteristics of a known selectively scattering, high efficiency projection screen of Group B.

The polar diagram of FIG. 1 shows the radiation characteristics in only one plane. In order to obtain a complete picture regarding the radiation characteristics of a projection screen, the polar diagram must also be shown for other planes located in the incident light direction I. Isotropic projection screens show the same polar behaviour for all planes enclosing the incident light direction I in the case of vertical incidence of light, while anisotropic projection screens show a different polar behaviour for different planes.

In the case of an isotropic projection screen, a maximum light output is obtained if all the incident light is uniformally scattered back with a cone. In FIG. 2 of the accompanying drawings, the circular sector-shaped line C represents the radiation characteristic of such an ideal projection screen which uniformly scatters back the incident light within a scattering angle $\beta$.

A small scattering angle $\beta$ gives a bright projection image and correspondingly limits the area within which the image can be observed. A radiation characteristic in accordance with line C has not hitherto been achievable.

In many cases the viewers looking at a projection screen adopt a horizontally widely fanned-out seating arrangement limited vertically by a narrow band. The light scattered back above and below this narrow band is wasted. In such cases higher efficiency is obtained with an anisotropic projection screen which scatters back the incident light horizontally in a scattering angle $\beta_H$ and vertically in a narrower scattering angle $\beta_V$ than with an isotropic projection screen.

SUMMARY OF THE INVENTION

Accordingly, it is an object of the invention to provide an improved projection screen and a method of making such an improved projection screen.

Another object of the invention is to provide a projection screen formed by a plurality of irregularly distributed structural elements.

Yet another object of the invention is to provide a projection screen comprising irregular elements shaped like the outer surface of contiguous bubbles.

According to the present invention there is provided a projection screen comprising a viewing surface, said surface being formed by a plurality of irregularly distributed microstructural elements shaped and disposed such that said surface is shaped like the outer surface of a plurality of contiguous bubbles.

According to the present invention there is also provided a method of making such a projection screen.

The present invention is based on the realization that the microstructure of an ideal projection screen should preferably have the following properties:

1. It must be sufficiently fine that it cannot be resolved by the eye at the minimum viewing distance provided.

2. With reference to the wavelength of the projection light the microstructure must be sufficiently coarse to prevent wavelength-dependent diffraction effects.

3. The microstructure must not be periodic, so that moiré effects cannot occur.

4. It must be of reflection sub-group $B_2$, so that illuminating and reflected beams are sufficiently separated to avoid the casting of shadows by viewers or the impeding of vision by the projector.

5. The angles of inclination of surface elements of the microstructure must be limited in such a way that incident light is scattered back horizontally within a selectable scattering angle $\beta_H$ and vertically within a selectable scattering angle $\beta_V$.

6. The angles of inclination must be homogeneously distributed in such a way that within the scattering angle specified under requirement 5, the intensity of the reflected light is direction-invariant.

7. Mutiple reflections on the microstructure which impair efficiency must be avoided.

8. The microstructure must not cause depolarization.

9. Absorption must be as low as possible.

In general the prior art projection screens fulfill requirements 1 to 4 very well, but often only partly fulfill requirements 5 to 9. In particular, no projection screen is known which simultaneously satisfactorily fulfills all these conditions.

The above, and other objects, features and advantages of this invention will be apparent from the following detailed description of illustrative embodiments, which is to be read in connection with the accompanying drawings.

DESCRIPTION OF THE PREFERRED EMBODIMENTS

Figure 3:
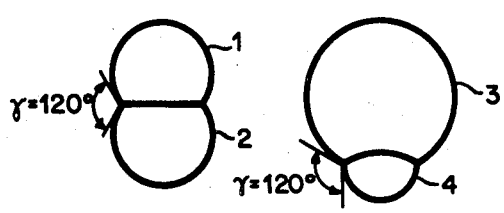
FIG. 3 shows diagrammatically two pairs of contiguous bubbles.

Referring to FIG. 3, this figure shows two contiguous liquid bubbles 1 and 2 of the same size, and two contiguous liquid bubbles 3 and 4 of a different size, formed from a soap solution, liquid plastic material or the like. For reasons of static equilibrium, three contiguous sheets of such pairs of enclosures always form an angle $\gamma = 120°$, independent of their size.

Figure 4:
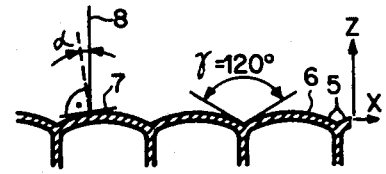
FIGS. 4 and 5 show the microstructure of a projection screen in horizontal and vertical section respectively.

This angular law is utilized in the case of the projection screen according to the present invention, made, for example, from expanded or foamed plastic material, whereby according to FIG. 4 its structural elements have the surface configuration of contiguous bubbles 5. The outermost contact surface 6 of the approximately equally large bubbles 5 randomly distributed on a plane approximately forms a mathematically piecewise smooth surface. FIG. 4 shows a surface element 7 of said surface structure formed by bubbles 5 whose normal to the surface is inclined by an angle $\alpha$ relative to a vertically incident light beam 8. It is clear that the angle of inclination $\alpha$ of such surface elements 7 occurs with the same frequency in the range $-30° < \alpha < +30°$, but that larger angles of inclination do not occur.

Figure 5:
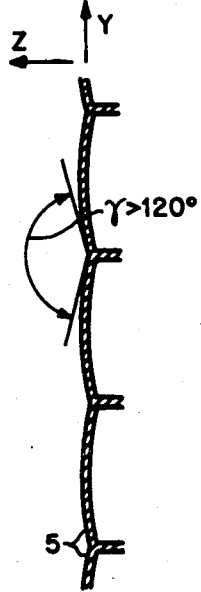
Figure 6:
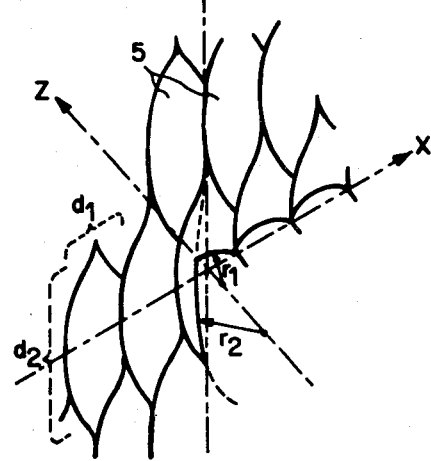
FIG. 6 shows the microstructure of a projection screen perspectively.

In order that only the outermost contact surface 6 of bubbles 5 be optically active, it is made reflective. The incident light is then uniformly reflected only within a cone having a scattering angle $\beta$ of 120° (FIG. 2), and if the bubbles 5 are sufficiently small it is diffusely reflected for an observer within this angle. Furthermore, through limiting the angle of inclination $\alpha$ to $\pm 30°$, multiple reflections which impair efficiency are prevented, so that depolarization is also substantially avoided. The angles of inclination $\alpha$ of the surface elements 7 can be limited to a range which is smaller than $\pm 30°$ by stretching the bubbles 5, which may, for example, be formed on a body, in the projection screen plane and consequently stretching the body by an incremental length, increasing the angle $\alpha$ between the contiguous bubbles 5. As a result both the horizontal light scattering angle $\beta_H$ and the vertical light scattering angle $\beta_V$ can be given chosen or predetermined values. If the bubbles 5 or the body on which they are formed are mainly stretched parallel to the vertical axis of the projection screen an anistropic radiation characteristic is obtained. FIG. 5 shows a vertical section of the microstructure of such a projection screen with bubbles 5 stretched parallel to the vertical axis, while FIG. 6 provides a three-dimensional view. In FIG. 6 the horizontal axis of the projection screen is designated by X, the vertical axis by Y, the axis perpendicular to plane XY by Z, the average radius of the outer bubble surface in plane XZ by $r_1$ and in plane YZ by $r_2$, the length in axis X by $d_1$ and in axis Y by $d_2$.

Tests have shown that by means of an expanded film of plastic material stretched parallel to the vertical axis Y of the projection screen it is easily possible to obtain a vertical scattering angle $\beta_V$ of less than 20°, leading to a corresponding high efficiency of the screen. The horizontal scattering angle $\beta_H$ can also be made narrower if the bubbles 5 are additionally stretched parallel to the horizontal axis.

Figure 7:
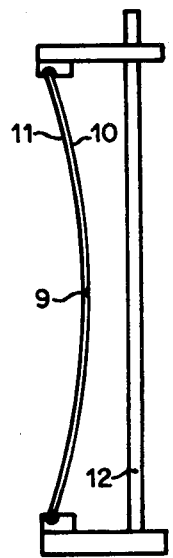
FIG. 7 shows a projection screen secured in a mounting support.

As a result of a narrower vertical scattering angle $\beta_V$, the projection screen must be slightly cylindrically curved about a horizontal axis like a cylindrical concave mirror, so that the light which strikes the projection screen at different heights is uniformly reflected in the direction of the viewer from all points on the screen. A wider horizontal scattering angle $\beta_H$ does not require a corresponding curvature about a vertical axis. FIG. 7 shows such a curved projection screen 9 which comprises an expanded film 11 of plastic material drawn onto a rigid flat carrier 10 and secured in a mounting support 12. The desired radius of curvature of the projection screen 9 can be adjusted by means of mounting support 12. Thus, it is possible to adjust the usable viewing distance range, whereby its depth can be fixed by an appropriate choice of the vertical scattering angle $\beta_V$.

Figure 1:
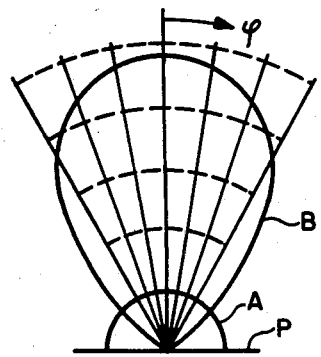
FIGS. 1 and 2, which have been referred to above in relation to the background of the invention, are polar diagrams representing radiation characteristics of projection screens.
Figure 2:
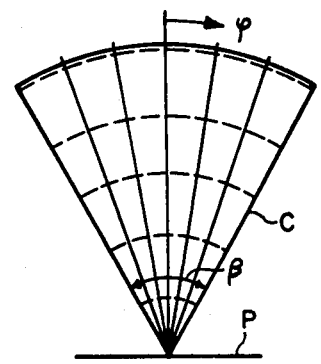

The above-mentioned remarks have shown that all the above requirements 1 to 9 can be fulfilled with embodiments of the projection screen described, and that a radiation characteristic according to FIG. 2 can be obtained. Compared with conventional projection screens, the high efficiency obtained permits a considerable reduction of the light output of the projector, or for the same light output the projection of a brighter picture which has a high contrast even in a completely illuminated room because, due to the narrow vertical scattering angle $\beta_V$ of the projection screen, the ambient light is not reflected in the direction of the viewer as a disturbing scattered light.

As has been stated hereinbefore an expanded film of plastic material, optionally stretched parallel to at least one axis, is suitable for use as the projection screen with the described microstructure. An expanded polypropylene film is particularly suitable. Depending on the stretching process used, the bubble surface may become deformed due to the internal pressure reduction produced during the volume increase, and as a result the convex bubble structure changes into a concave structure. However, despite this inversion there is no significant change to the macroscopically observable scattering characteristic.

For surface reflection purposes a thin metal layer, for example of aluminum, can be deposited by evaporation on said surface, and its high reflectivity prevents the incident light from being absorbed by the plastic material and/or being scattered in undesired directions. The metallized surface can subsequently be protected against mechanical damage by a thin transparent protective coating, for example a varnish coating. This varnish coating can also be used to influence within certain limits the radiation characteristics of the projection screen. The film of plastic material is preferably drawn onto a rigid or stiff flat carrier in order to make the projection screen adequately rigid for practical use.

A projection screen with the above-described microstructure can also be produced by forming the surface structure of an expanded plastic material on the flat member or body of a suitable material, which may for example also be a plastic material. Preferably a metal copy serving as a stamping die is made from the surface structure of the expanded plastic material by either chemical coating or electric plating, and by means of this die, accompanied by the application of pressure and heat, the microstructure is stamped into a flat body made from a thermoplastic material. This process permits inexpensive mass production. The surface structure of the expanded plastic material can also be formed directly on a plastic material with a low softening point or on a curable plastic material whereby each of these serves as the projection screen.

After forming the surface structure of the expanded plastic material, the flat body is stretched. This avoids undefinable deformation which may occur during the stretching of expanded plastic material.

A duplicate produced by forming an expanded plastic material can be metallized and used as a reflecting projection screen in the same way as described hereinbefore for the original made from expanded plastic material. It is also possible to make the duplicate from a transparent material and use it as a transmission projection screen without making the surface reflective. The radiation characteristic of such a transmission screen admittedly differs somewhat from that of the described reflection screen; however, the essential characteristics, namely the statistical distribution of the structural elements, the frequency distribution of the angles of inclination, a limitation of the scattering angle, and the optical anisotropy are maintained.

In the transmission screen the above-described measure for curving the reflection screen for the purpose of focussing the reflected light in the observation area is replaced by arranging a spherical or cylindrical convergent lens, preferably a Fresnel lens, directly in front of or behind the transmission screen.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. In a method of producing an optical projection screen on a body,
   the steps comprising:
   forming a plurality of adjacent randomly distributed and irregularly sized micro-structural bubble-shaped elements on one major curved surface of said body, said bubble-shaped elements having a predetermined range of angles of inclination with respect to at least one direction tangent to said surface, and
   limiting said predetermined range of angles of inclination by stretching said body by a first incremental length in said one direction, so that in an operative position of said screen light operatively incident on said screen is scattered therefrom in a predetermined plane at an angle to said surface and including said one direction within a selectable first scattering angle, said first scattering angle being at least partially dependent on said first incremental length.

2. In a method of producing an optical projection screen as claimed in claim 1, wherein said bubble-shaped elements have a prearranged range of angles of inclination with respect to an other direction substantially perpendicular to said one direction, and further comprising the step of limiting said prearranged range of angles of inclination by stretching said body in said other direction by a second incremental length, so that in the operative position of said screen light operatively incident on said screen is scattered therefrom in a prearranged plane at an angle to said surface, and including said other direction, within a selectable second scattering angle, said second scattering angle being at least partially dependent on said second incremental length.

3. In a method as claimed in claim 1, further comprising the step of homogeneously distributing said angles of inclination on said surface in such a way that the intensity of light reflected from said screen is substantially direction-invariant.

4. In a method as claimed in claim 1, further comprising the step of forming said micro-structural bubble-shaped elements on said one surface of said body so that any multiple reflections of light incident on said micro-structural bubble-shaped elements are substantially avoided.

5. In a method as claimed in claim 1, further comprising the step of forming said micro-structural bubble-shaped elements on said one surface of said body in a substantially aperiodic manner, whereby moiré effects are substantially avoided.

6. In a method as claimed in claim 1, wherein said body is composed of thermoplastic material, and said micro-structural elements are formed by impressing said body with a die under heat and pressure.

7. In a method as claimed in claim 1, wherein said elements are formed of foamed plastic material.

8. In a method as claimed in claim 1, further comprising the step of applying a reflective coating to said elements.

9. In a method as claimed in claim 8, further comprising the step of applying a transparent protective coating to said reflective coating.

10. An optical projection screen, for reflecting light impinging thereon, comprising in combination:
    a body having a major curved surface, and
    a plurality of adjacent randomly distributed and irregularly sized micro-structural bubble-shaped elements of foamed plastic material, said bubble-shaped elements having a predetermined range of angles of inclination with respect to at least one direction tangent to said surface, said predetermined range of angles of inclination being limited by said body having been stretched by a first incremental length in said one direction, so that in an operative position of said screen light operatively incident on said screen is scattered therefrom in a predetermined plane substantially at right angles to said surface, and including said one direction, within a selectable first scattering angle, said first scattering angle being at least partially dependent on said first incremental length.

11. An optical projection screen as claimed in claim 10, wherein said bubble-shaped elements have a prearranged range of angles of inclination with respect to an other direction substantially perpendicular to said one direction, said prearranged range of angles of inclination being limited by said body having been stretched in said other direction by a second incremental length, so that in an operative position of said screen light operatively incident on said screen is scattered therefrom in a prearranged plane substantially at right angles to said surface, and including said other direction, within a selectable second scattering angle, said second scattering angle being at least partially dependent on said second incremental length.

12. An optical projection screen as claimed in claim 10, wherein the surface portion of each element bordering the surface portion of an adjacent element forms an angle of at least 120°.

13. A projection screen, as claimed in claim 12, wherein said body and said elements disposed thereon are flexible, and operable to be placed into a predetermined shape, and further comprising:
   a carrier to which said body is secured,
   a support for holding said carrier, and
   adjustment means for imparting to said body an adjustable curvature.

14. A projection screen as claimed in claim 12, wherein said body comprises a foamed film of plastic material.

15. A projection screen according to claim 12, wherein a reflective coating is applied to said bubble-shaped elements.

16. A projection screen according to claim 15, wherein a transparent protective coating is applied to said reflective coating.

17. A projection screen according to claim 12, wherein said body is flat.

18. An optical projection screen as claimed in claim 10, wherein the angles of inclination of said bubble-shaped elements are homogeneously distributed on said surface in such a way that the intensity of light reflected from said screen is substantially direction-invariant.

19. An optical projection screen as claimed in claim 10, wherein said micro-structural bubble-shaped elements are disposed on said surface so that any multiple reflections of light incident on said micro-structural bubble-shaped elements are substantially avoided.

20. An optical projection screen as claimed in claim 10, wherein said micro-structural bubble-shaped elements are disposed on said surface in a generally aperiodic manner, whereby moire effects are substantially avoided.

21. In a method of producing an optical projection screen on a body,
   the steps comprising:
   forming a plurality of adjacent randomly distributed and irregularly sized micro-structural bubble-shaped elements on one major curved surface of said body, said bubble-shaped elements having a predetermined range of angles in inclination from $-30°$ to $+30°$, occurring substantially at the same frequency, with respect to said surface, and
   reducing said predetermined range of angles of inclination by stretching said body by a first incremental length in a first direction tangent to said surface.

22. In a method as claimed in claim 21, further comprising the step of stretching said body by a second incremental length in a second direction perpendicular to said first direction.

* * * * *